(12) United States Patent
Ocket et al.

(10) Patent No.: US 11,441,885 B2
(45) Date of Patent: Sep. 13, 2022

(54) SENSOR DEVICE FOR MEASURING THE ROTATIONAL POSITION OF AN ELEMENT

(71) Applicants: TE Connectivity Belgium BV, Oostkamp (BE); TE Connectivity Germany GmbH, Bensheim (DE)

(72) Inventors: Tom Ocket, Oostkamp (BE); Tobias Becker, Speyer (DE); Moritz Harz, Speyer (DE)

(73) Assignees: TE CONNECTIVITY GERMANY GMBH, Bensheim (DE); TE CONNECTIVIYU BELGIUM BV, Oostkamp (BE)

( * ) Notice: Subject to any disclaimer, the term of this patent is extended or adjusted under 35 U.S.C. 154(b) by 26 days.

(21) Appl. No.: 17/016,781

(22) Filed: Sep. 10, 2020

(65) Prior Publication Data
US 2021/0080243 A1    Mar. 18, 2021

(30) Foreign Application Priority Data
Sep. 12, 2019 (EP) .................................... 19196866

(51) Int. Cl.
*G01B 7/00* (2006.01)
*G01B 7/28* (2006.01)

(52) U.S. Cl.
CPC ............. *G01B 7/003* (2013.01); *G01B 7/281* (2013.01)

(58) Field of Classification Search
CPC . G01B 7/00; G01B 7/02; G01B 7/003; G01B 7/28; G01B 7/281; G01B 17/00; G01D 5/2053; G01D 5/485; G01F 23/2963
See application file for complete search history.

(56) References Cited

U.S. PATENT DOCUMENTS

| 5,815,091 A | 9/1998 | Dames et al. | |
| 2005/0122197 A1* | 6/2005 | Aoki | G01D 5/2086 336/115 |
| 2010/0001718 A1* | 1/2010 | Howard | G01B 7/30 324/207.15 |

FOREIGN PATENT DOCUMENTS

EP    2884238 A1    6/2015

OTHER PUBLICATIONS

Extended European Search Report, European Application No. 19196866.8-1010, European Filing Date, Feb. 17, 2020.

* cited by examiner

*Primary Examiner* — Jermele M Hollington
*Assistant Examiner* — Suresh K Rajaputra

(57) ABSTRACT

A sensor device for measuring a rotational position of an element that is rotatable about an axis of rotation includes a sender member emitting a magnetic field and a plurality of receiving members receiving the magnetic field. Each of the receiving members has a pair of conductors that together delimit a pair of surrounded areas. Each of the surrounded areas tapers in and against a circumferential direction at ends of the surrounded areas.

18 Claims, 6 Drawing Sheets

SENSOR DEVICE FOR MEASURING THE ROTATIONAL POSITION OF AN ELEMENT

CROSS-REFERENCE TO RELATED APPLICATION

This application claims the benefit of the filing date under 35 U.S.C. § 119(a)-(d) of European Patent Application No. 19196866, filed on Sep. 12, 2019.

FIELD OF THE INVENTION

The present invention relates to a sensor device and, more particularly, to a sensor device for measuring the rotational position of an element that is rotatable about an axis of rotation.

BACKGROUND

Sensor devices for measuring the rotational position of an element that is rotatable about an axis of rotation commonly include at least one sender member for emitting a magnetic field and at least two receiving members for receiving the magnetic field. Such sensor devices, however, are often imprecise.

SUMMARY

A sensor device for measuring a rotational position of an element that is rotatable about an axis of rotation includes a sender member emitting a magnetic field and a plurality of receiving members receiving the magnetic field. Each of the receiving members has a pair of conductors that together delimit a pair of surrounded areas. Each of the surrounded areas tapers in and against a circumferential direction at ends of the surrounded areas.

BRIEF DESCRIPTION OF THE DRAWINGS

The invention will now be described by way of example with reference to the accompanying Figures, of which.

DETAILED DESCRIPTION OF THE EMBODIMENT(S)

The invention will now be described in greater detail and in an exemplary manner using embodiments and with reference to the drawings. The described embodiments are only possible configurations in which, however, the individual features as described herein can be provided independently of one another or can be omitted.

Sensor devices 100 for measuring the rotational position of an element 110 that is rotatable about an axis of rotation 8 are shown in FIGS. 1-6. The rotatable element 110 shown in FIGS. 3, 4, and 6 can be a shaft 111, for example a shaft of a car engine.

Figure 1:
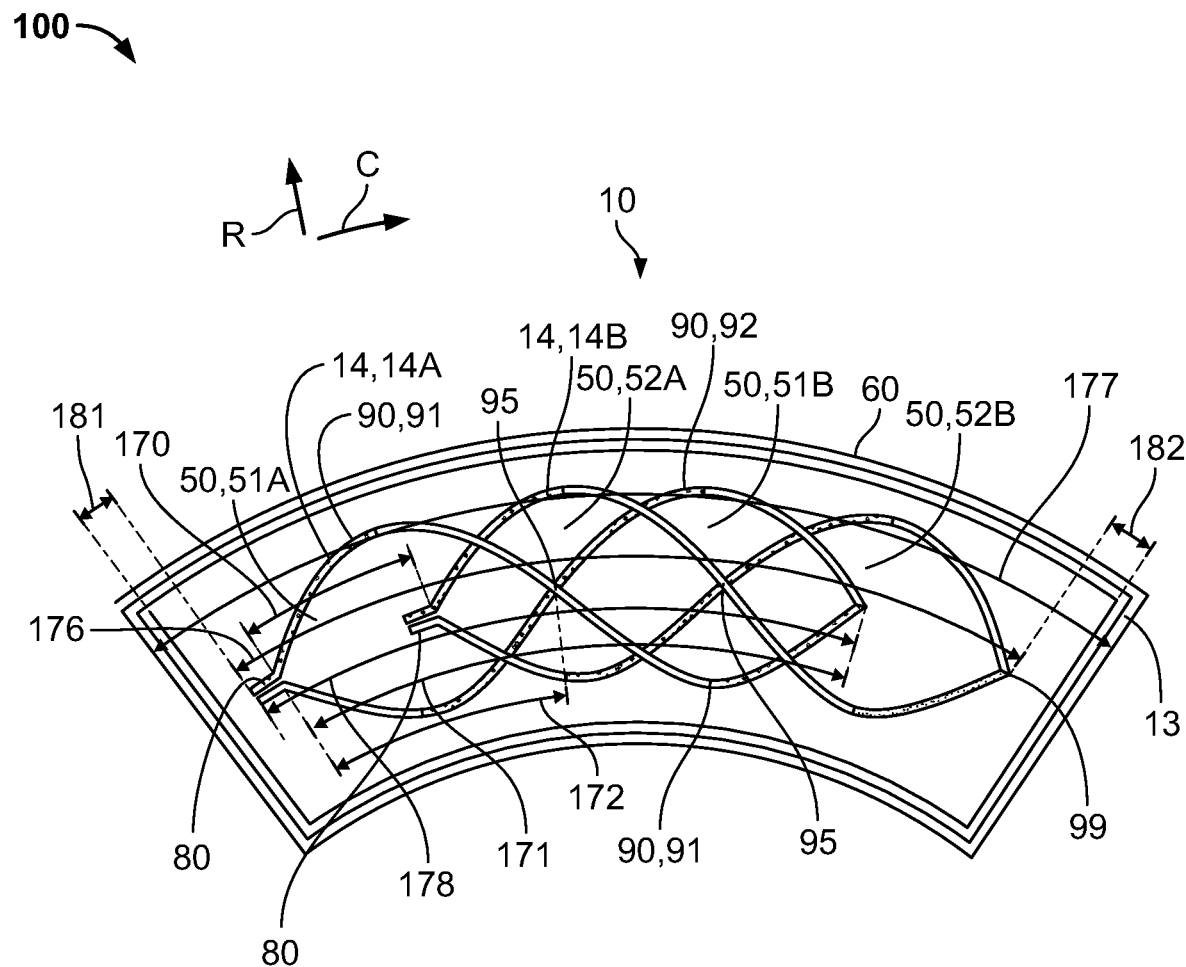
FIG. 1 is a schematic diagram of a sensor device according to an embodiment.

Each sensor device 100, as shown in FIG. 1, includes an electromagnetic transducer 10. Each transducer 10 has at least one sender member 13 for emitting a magnetic field and at least two receiving members 14 for receiving the magnetic field.

A metallic element is attached to the rotatable element 110 such that it rotates with the element 110. In the embodiment shown in FIGS. 3 and 4, four flaps 115 are connected to the shaft 111 and protrude sideways away from the shaft 111 perpendicular to the axis 8. The flaps 115 disturb the magnetic field generated by the sender member 13 so that the receiving members 14 receive different magnetic strengths of the magnetic field depending on the position of the flaps 115 and thus on the rotational position of the element 110. From the signals received by the receiving members 14, the rotational position of the element 110 can hence be deduced.

Figure 3:
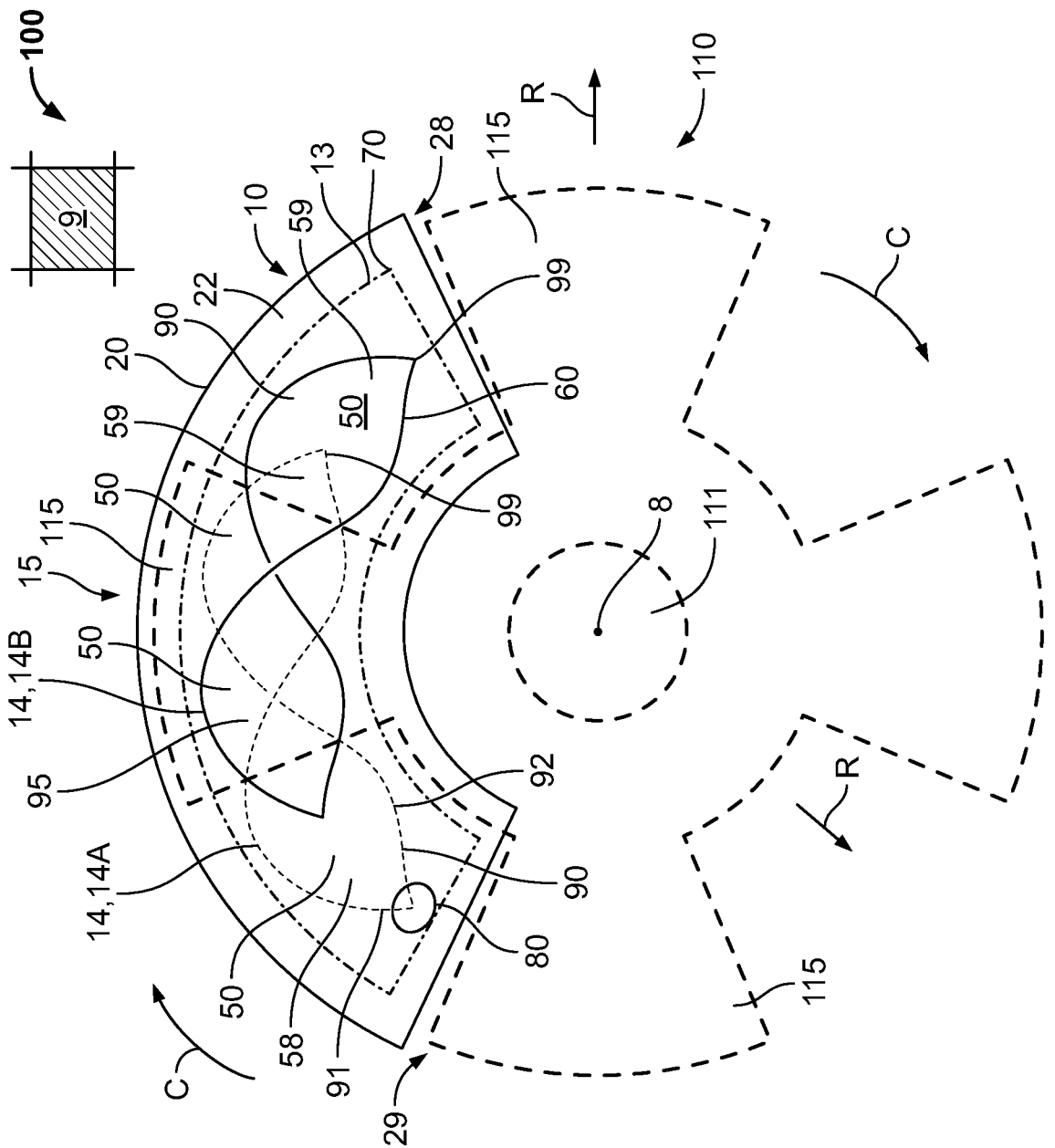
FIG. 3 is a schematic diagram of a sensor device according to another embodiment.
Figure 5:
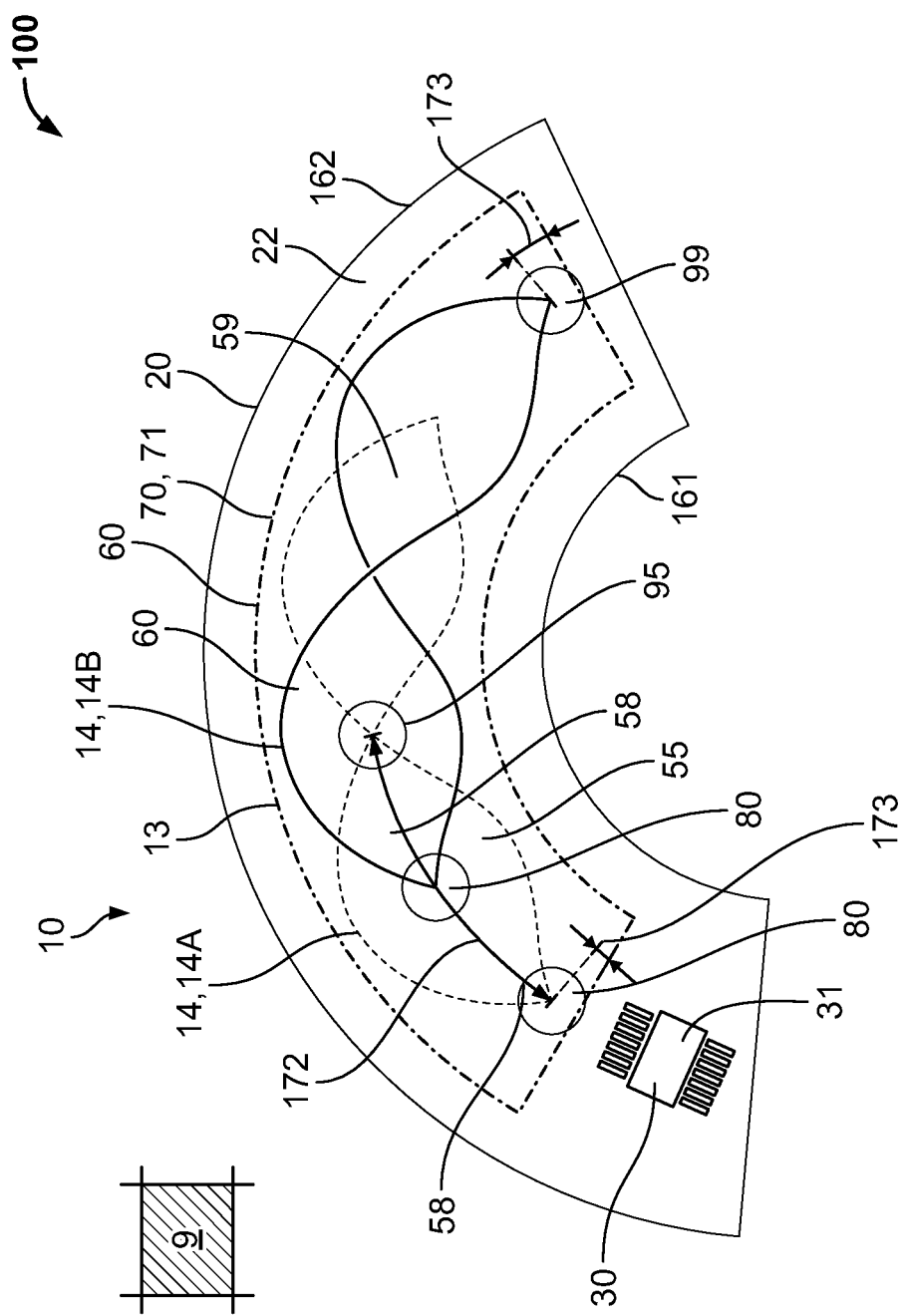
FIG. 5 is a schematic diagram of a sensor device according to another embodiment.
Figure 6:
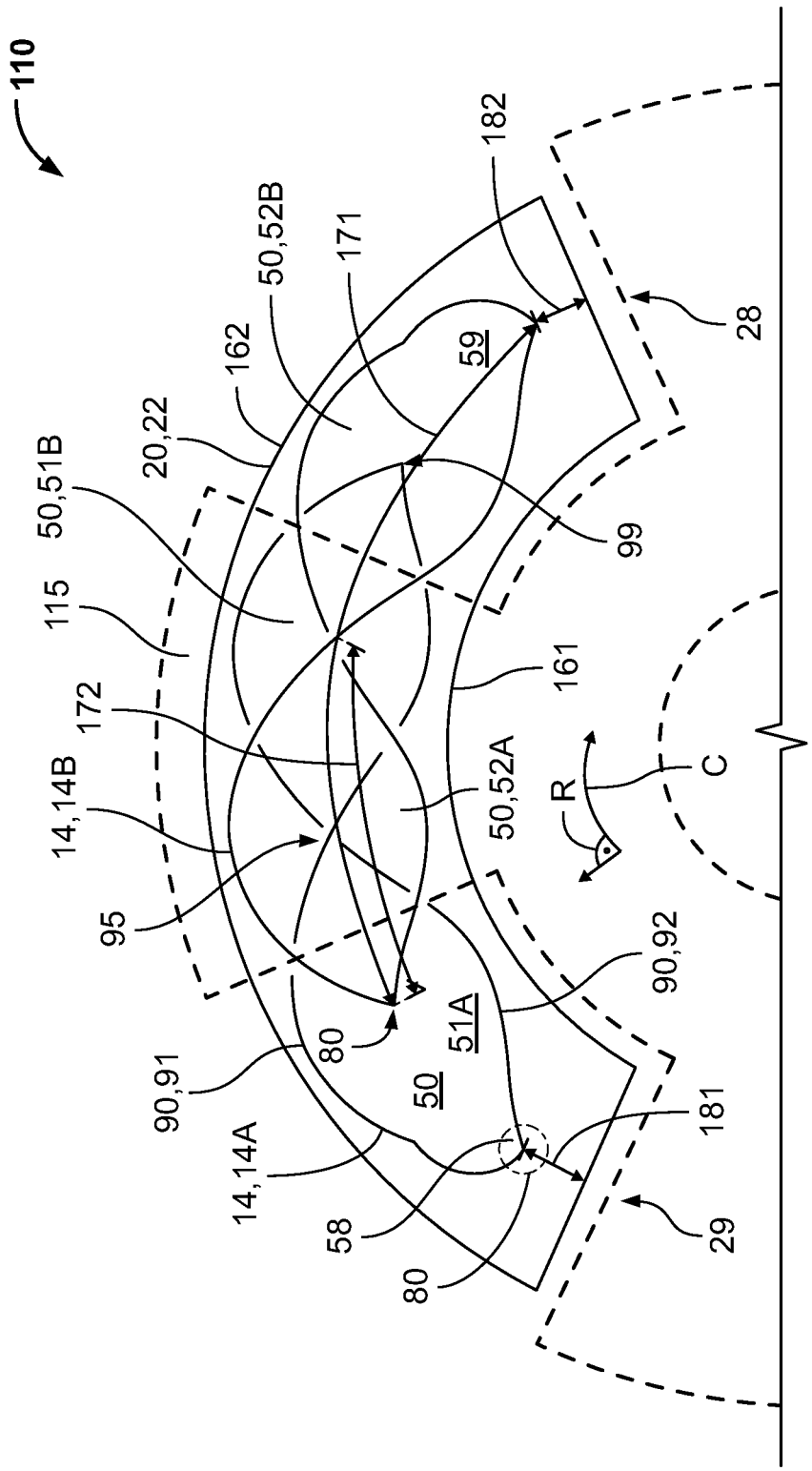
FIG. 6 is a schematic diagram of a sensor device according to another embodiment.

The sensor device 100 can include an arcuate carrier 20, as shown in the embodiments of FIGS. 3, 5, and 6. The sensor device 100 and in particular the arcuate carrier 20 has a substantially partially annular shape or C-shape. An inner edge 161 and an outer edge 162 of the arcuate carrier 20 are arc-shaped.

In the embodiment shown in FIG. 5, the sensor device 100 has one controller 30 which is embodied as an integrated circuit 31. The controller 30 is used for controlling the transducer 10. The data of the controller 30 can then be processed in a further, non-depicted module. The controller 30 is arranged on the arcuate carrier 20.

The sender member 13 comprises conductive paths 60 that form a coil 70 as shown in FIG. 5, in particular a spiral coil 71 on the arcuate carrier 20, which is embodied as a PCB 22. When running a current through the sender member 13, a magnetic field results which is then disturbed by the flaps 115 and received by the receiving members 14. Depending on whether the current runs in one direction or the other, for example clockwise or counterclockwise in the sender member 13, the magnetic field is directed in one direction or the other. In an embodiment, the magnetic field that is generated is an alternating magnetic field. This magnetic field can be generated by applying an alternating current at the sender member 13.

Figure 2:
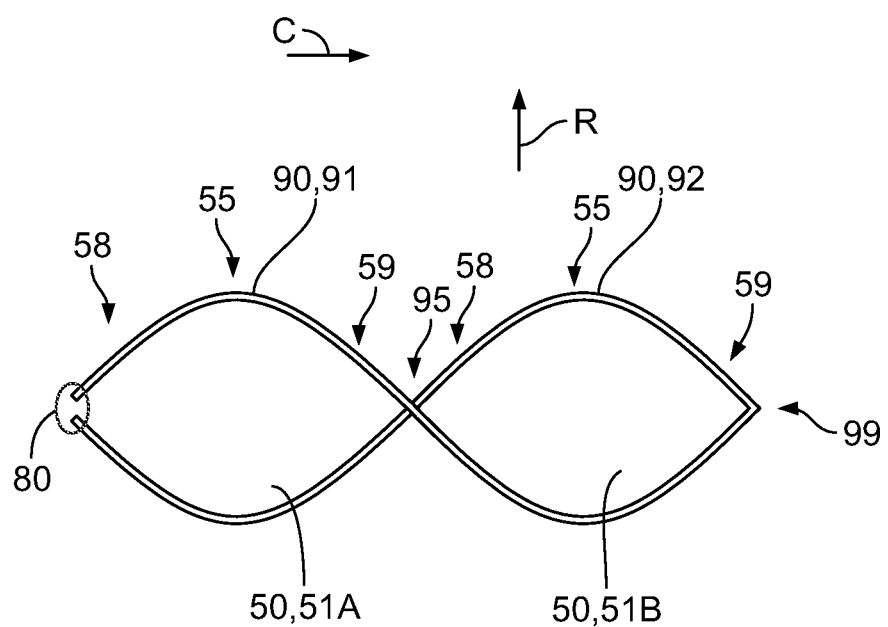
FIG. 2 is a schematic diagram of a receiving member of the sensor device.

Each of the receiving members 14, as shown in FIGS. 1, 2, and 5, includes two conductors 90 embodied as conductive paths 60 on the PCB 22. The conductive paths 60 resemble graphs of a periodic function, in particular a sine function. The conductors 90 thus have an elongated shape that is sinusoidal. The conductor 90 can have the shape of a path or a wire.

The first conductor 90, 91 starts at a contact section 80 and runs over one period of the periodic function along a circumferential direction C. At a junction 99, it is connected to the second connector 90, 92 which runs against the circumferential direction over one period back to the contact section 80. In the shown embodiment, each of the receiving members 14 and in particular the conductors 90, 91, 92 enclose or surround two surrounded areas 50 and resemble two eyes.

In the transducer 10, the two receiving members 14 are shifted by a quarter of a period 171 of the periodic function along the circumferential direction C, as shown in FIGS. 1 and 6.

In order to avoid a crossing of the conductive paths 60, parts of the conductive paths 60 can be arranged on different levels which are for example separated by insulating layers or which can be arranged on a front side and a back side of the PCB 22.

In the transducer 10, as shown in FIGS. 1 and 5, the sender member 13 surrounds the receiving members 14 to save space. The sender member 13 and the receiving members 14 are basically flat or planar and lie in a plane 9 that is perpendicular to the axis 8. The entire sensor device 100 is basically a flat element arranged in this plane 9.

In FIG. 1, the details of a transducer 10 are shown. In FIG. 2, a receiving member 14 is depicted in detail. Each of the two receiving members 14, 14A, 14B as shown in FIG. 1 has two conductors 90, 91, 92 that together delimit two surrounded areas 50, the surrounded areas 50 each expanding and contracting in a circumferential direction C about the axis of rotation 8. The term delimit can here be understood as circumscribe, surround and/or substantially enclose. The conductors 90, 91, 92 do not have to be entirely closed around the surrounded areas 50. In order to further improve the precision, the first and the last of the surrounded areas 50 in the circumferential direction C can expand and contract.

The combination of the two conductors 90, 91, 92 is not entirely closed. In particular around the first surrounded areas 50, 51A, 52A the conductors 90, 91, 92 are slightly spaced apart at the contact section 80 at which contact to the conductors 90 is made. The conductors 90 circumscribe or surround or substantially enclose the surrounded areas 50. In an embodiment, the two conductors 90 are substantially symmetrical or mirror symmetrical to each other with respect to a reflection at a cylindrical circumferential surface. The two conductors 90 can form two loops delimiting or surrounding the surrounded areas 50.

The surrounded areas 50 are basically planar. They lie one behind the other in the circumferential direction C. The two neighboring surrounded areas 50 are separated from each other by a crossing 95 of the conductors 90. In this area of crossing 95, the two conductors 90 can be located at different levels to avoid a current flow. For example, they can be located on a front side and a back side of the PCB 22.

Each of the surrounded areas 50 tapers in and against the circumferential direction C at their ends. That means that each of the surrounded areas 50 can taper in one direction and in the opposite direction and not just in one of the two directions. Each of the surrounded areas can expand in the middle. The surrounded area 50 is widest at a middle section 55 shown in FIG. 2, the width being measured in a radial direction R that points away from the axis 8 and is perpendicular to the axis 8. The radial direction R is further perpendicular to the circumferential direction C. At end sections 58 and 59, the surrounded areas 50 are wedge-like with sharp tips. Such a configuration avoids artifacts and thus allows a more precise measurement.

The end sections 58, 59 are each spaced apart from the sender member 13 by a distance 173 along the circumferential direction C, as shown in FIG. 5. Each of the surrounded areas 15 is thus eye-shaped or lentil-shaped in the shown embodiment. Each of the two conductors 90, 91, 92 has an elongated shape that resembles a graph of a spatially periodic function, in particular a sine function.

The two receiving members 14 have an identical shape and are shifted by a quarter of a period 171 to each other along the circumferential direction C, as shown in FIG. 1. Such a mechanical shifting relates to an electrical shifting of Pi/2 and is approximately half a length 172 of a surrounded area 50. The two receiving members 14 have a distance 170 between them along the circumferential direction C.

The sections of the two conductors 90 that enclose the surrounded areas 50 comprise mainly or only curved sections in order to improve the signal quality. No straight sections are present in these sections. Moreover, the two conductors 90 comprise no straight sections that run in the radial direction R. Although in the area of the contact sections 80, straight sections are present, these sections do not run in the radial direction R. Such straight sections can however be present in other parts of the conductors 90. For example, parts of the conductors 90 that do not surround the surrounded areas 50 and/or do not bound/limit the surrounded areas 50 in particular in the radial direction R but lead towards the surrounded areas 50 and are used for contacting, e.g. end in a terminal or solder part, can comprise straight sections. In another embodiment, sections of the two conductors 90 that enclose the surrounded areas 50 comprise straight sections.

The sender member 13 surrounds the receiving members 14, as shown in FIG. 1. Each distance 181, 182 between the sender member 13 and the receiving members 14 along the circumferential direction C is less than a quarter of the period 171 and less than one quarter of the length 177 of the sender member 13 along the circumferential direction C and further less than one quarter of the length 178 of the receiving member 14 along the circumferential direction C. The receiving members 14 have a length 176 along the circumferential direction C. The distance 181, 182 can moreover be less than ½ a length 172 of the surrounded area 50 along the circumferential direction C.

In FIG. 3, a further embodiment of a sensor device 100 is shown. The transducer 10 again comprises a sender member 13 and two receiving members 14. In each of the two receiving members 14, the conductors 90 surround two convex surrounded areas 50. At each of their ends in and against the circumferential direction C, the surrounded areas 50 taper. The surrounding areas 50 thus have an eye-shape.

Figure 4:
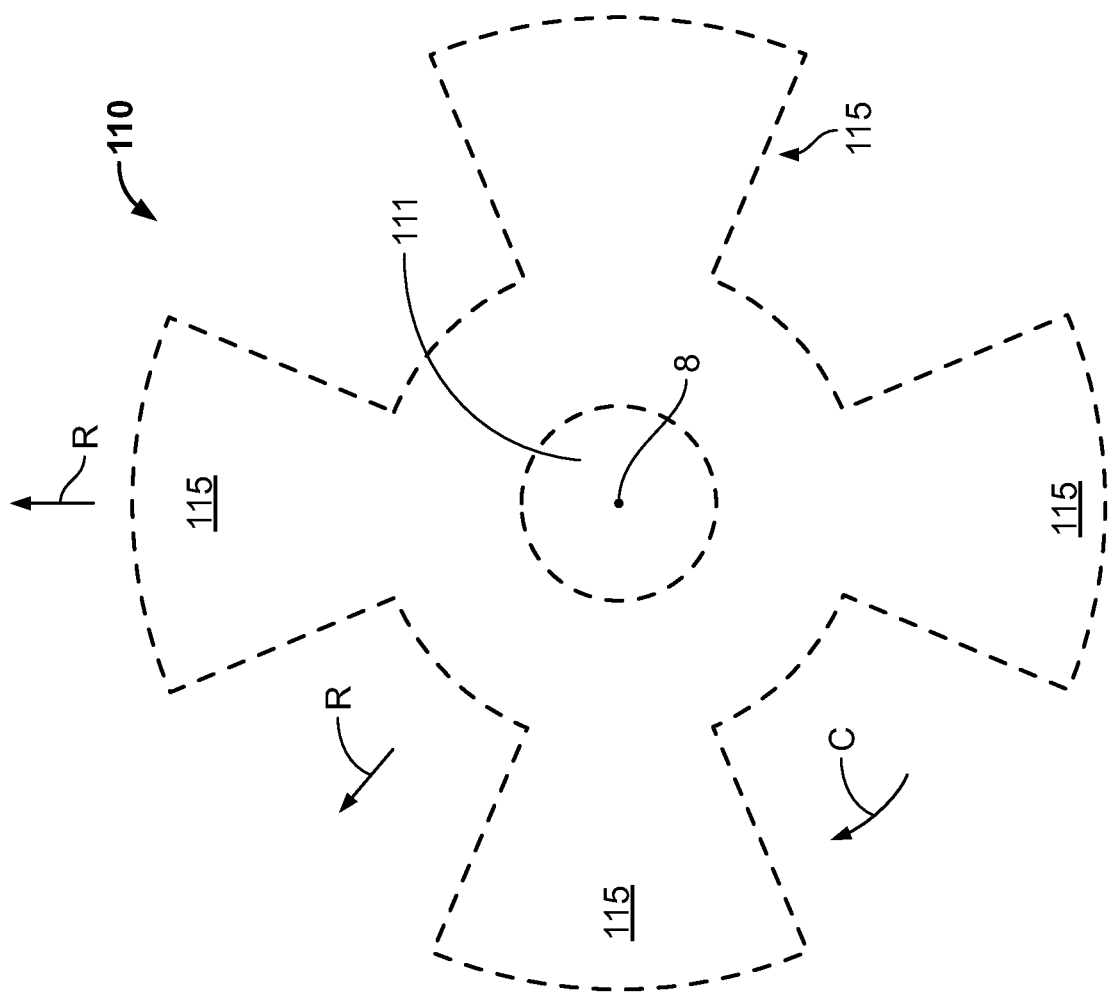
FIG. 4 is a schematic diagram of a rotatable element according to an embodiment.

In FIG. 4, the rotatable element 110 is shown. Four flaps 115 are arranged behind each other in the circumferential direction C and each protrudes along the radial direction R. The number of flaps 115 can be different in different embodiments. For example, three flaps 115 or five flaps 15 could be present.

In FIG. 5, a further embodiment of a sensor device 100 is shown. Similar to the one shown in FIG. 3, a transducer 10 is present. Further, this embodiment comprises a controller 30 in the form of an integrated circuit 31 that is located on a PCB 22.

A rotatable element 110 according to another embodiment is shown in FIG. 6. The embodiment shown in FIG. 6 differs from the previous embodiments in that two of the surrounding areas 50, namely the one at the ends 28, 29 are not convex. Rather, in each case one of the conductors 90, 91, 92 defines a small indent. The reason for such slightly modified geometry is because, at the ends of the transducer 10, the magnetic field is not perfectly homogeneous as in the rest of the transducer 10. To compensate this, the ends of the taper can be optimized to achieve a better signal quality (closer to the sine shape). This indent shown here is only as example. In another embodiment, the curved section should be smoother.

What is claimed is:

1. A sensor device for measuring a rotational position of an element that is rotatable about an axis of rotation, comprising:
   a sender member emitting a magnetic field; and
   a plurality of receiving members receiving the magnetic field, each of the receiving members has a pair of conductors that together delimit a pair of surrounded areas, each of the surrounded areas tapers in and against a circumferential direction at ends of the surrounded areas, the sender member and the receiving members are separated by a distance along the circumferential direction.

2. The sensor device of claim 1, wherein each of the surrounded areas is a convex area that expands and contracts in the circumferential direction about the axis of rotation.

3. The sensor device of claim 1, wherein each of the surrounded areas is eye-shaped.

4. The sensor device of claim 1, wherein each of the conductors has an elongated shape that resembles a graph of a spatially periodic function.

5. The sensor device of claim 1, wherein the receiving members have an identical shape.

6. The sensor device of claim 5, wherein the receiving members are shifted by a quarter of a period to each other along the circumferential direction.

7. The sensor device of claim 1, wherein the conductors are substantially symmetrical to each other with respect to a cylindrical circumferential surface.

8. The sensor device of claim 1, wherein a plurality of sections of the conductors that enclose the surrounded areas are curved sections.

9. The sensor device of claim 1, wherein the conductors have no straight sections extending in a radial direction.

10. The sensor device of claim 1, wherein the sender member has a coil.

11. The sensor device of claim 1, wherein the sender member surrounds the receiving members.

12. The sensor device of claim 4, wherein the distance between the sender member and the receiving members along the circumferential direction is less than one-quarter of a period.

13. The sensor device of claim 1, wherein the distance between the sender member and the receiving members along the circumferential direction is less than one-quarter of a length of the sender member along the circumferential direction.

14. The sensor device of claim 1, wherein the sender member and/or at least one of the receiving members substantially lie in a plane.

15. The sensor device of claim 1, wherein the sender member and/or at least one of the receiving member is a conductive path on a printed circuit board.

16. A sensor device for measuring a rotational position of an element that is rotatable about an axis of rotation, comprising:
   a sender member emitting a magnetic field; and
   a plurality of receiving members receiving the magnetic field, each of the receiving members has a pair of conductors that together delimit a pair of surrounded areas, each of the surrounded areas tapers in and against a circumferential direction at ends of the surrounded areas, at least one of the pair of surrounded areas is a non-convex surrounded area.

17. The sensor device of claim 16, wherein the non-convex surrounded area has an indent at an end.

18. The sensor device of claim 16, wherein at least one of the other surrounded areas is a convex area that expands and contracts in the circumferential direction about the axis of rotation.

* * * * *